Sept. 3, 1929.   R. S. AYRES   1,726,689

DISPENSING CONTAINER

Filed June 24, 1927

Inventor
Robert S. Ayres.
By Mason, Fenwick & Lawrence
Attorneys

Patented Sept. 3, 1929.

1,726,689

UNITED STATES PATENT OFFICE.

ROBERT SALE AYRES, OF KANSAS CITY, MISSOURI.

DISPENSING CONTAINER.

Application filed June 24, 1927. Serial No. 201,260.

This invention relates to dispensing containers, particularly adapted for use in connection with garden seed in bulk.

An object of this invention is to provide a dispensing container adapted for convenience of retail dealers, whereby they may be enabled to measure out a quantity of loose elements, such as seeds, to a customer without the need of using a scale or measuring glass.

The container, according to this invention, may be made in any desired size, having large or small measuring trough elements therein, according to the kind and size of the article to be dispensed, such as seeds.

A further object of this invention is to provide a measuring dispensing device or container which may be filled with the desired merchandise, such as bulk seed, when it leaves the warehouse, and the retailer, when he wishes to dispense a small quantity, such as five or ten cents worth, simply tips the box forward thus filling the trough on the inside of the container and delivers the measured quantity through a slot in the side of the container.

Other objects of this invention will appear from the following detailed description of the device and as disclosed in the single sheet of drawings herewith made a part of this specification.

Figure 1:
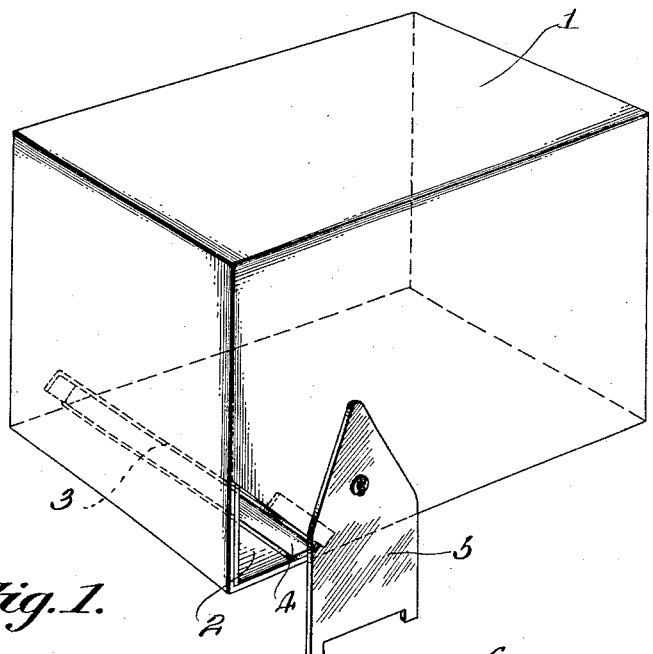
Figure 1 illustrates a perspective view of the seed container and dispenser.
Figure 2:
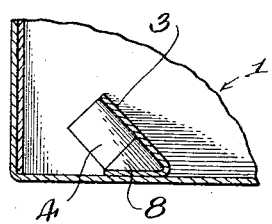
Figure 2 represents a sectional view of the dispensing and measuring element within the container.
Figure 3:
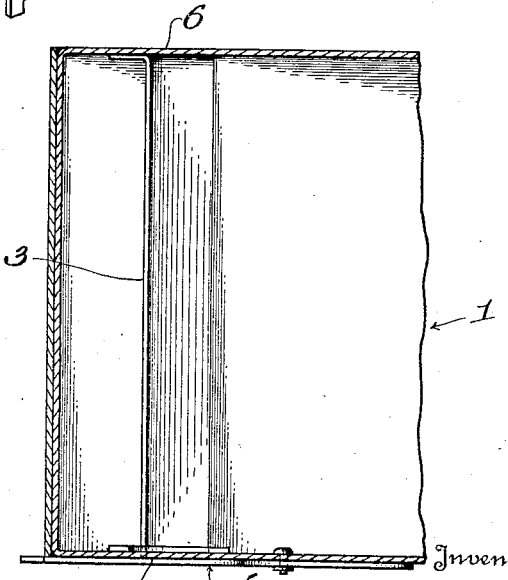
Figure 3 illustrates a top plan view of the dispensing and measuring element within the container.

Numeral 1 designates a container or box adapted to receive loose elements, such as garden seed in bulk, the container to be supplied with seed or other desired merchandise at the warehouse ready for delivering to the retail dealers.

In order to provide a means for dispensing and measuring a small quantity of seed within the container without first being compelled to remove the seed from the box or container and weigh in the ordinary scale previous to supplying a customer with a small purchase of the seed, an opening 2 is preferably made in the side near one corner thereof, while a guide or measuring element 3 is adapted to extend from one side of the container to the opposite side in such a manner that when the container holding the seed or other material is tipped forward, the seed will fill a trough 4 and be easily deflected from the container through the opening 2 by merely tipping the box in the proper direction. A suitably formed and adjustably arranged cover portion 5 is provided for the opening 2 in order to maintain the container in closed condition except when it is desired to deliver or dispense a measured quantity of seed from the opening 2.

The measuring plate or element 3 may be made of any suitable material and adapted for different sizes of cases, as well as for the kind and amount of seed to be dispensed therefrom.

It is preferred in this invention to connect the measuring or deflecting element 3 to the inner sides 6 and 7 of the container and also to the bottom portion 8 in such a manner that the trough 4 will accommodate a desired amount of seed to be dispensed on the tipping up of the container.

In operation, this invention provides a container having in combination therewith a measuring and dispensing device which will eliminate the necessity of delivering a quantity of material from the case to a scale before supplying a customer's need for a small quantity of the article. The containers, obviously, may be made in several sizes and the troughs constructed to accommodate various types of seed and the desired quantity to be measured therein.

The box or container is usually filled with the merchandise, such as seed, in the warehouse, and the retail dealer, when he desires to dispense a small amount of the seed, such as five or ten cents worth, merely tips the box forward thus filling the trough, then he opens the slot at the side and the material is allowed to deliver therefrom.

It is understood that alterations and substitutions may be made in the above disclosure within the scope of the claim without affecting the merits of this invention.

What I claim is:—

A dry measurer comprising a rectangular box having a triangular opening formed in the corner of one of the side walls of said box, a plate having one face substantially flush with the hypotenuse edge of said opening and extending with one of its edges in contact with the back wall between said side walls, from the apertured side wall to the opposite side wall, said plate being narrower than the length of said hypotenuse edge and having its other edge spaced from the adjacent end wall, and a plate forming a valve closure for said opening formed in the first named side wall.

In testimony whereof I affix my signature.

ROBERT SALE AYRES.